Dec. 17, 1935.   L. BRUNETTI   2,024,423
WHEEL ATTACHMENT FOR SLEDS
Filed April 27, 1935
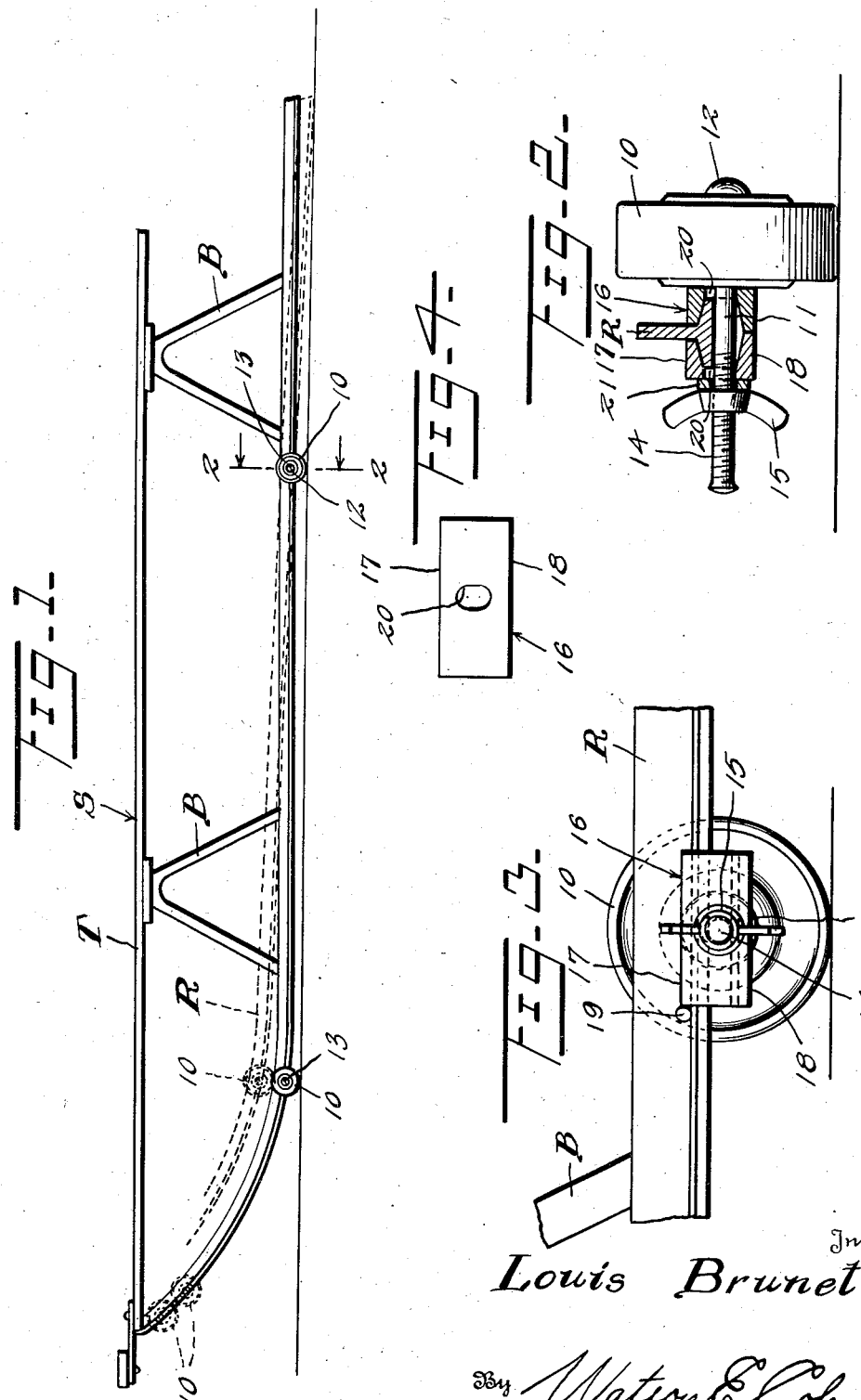
Inventor
*Louis Brunetti*

Patented Dec. 17, 1935

2,024,423

UNITED STATES PATENT OFFICE 2,024,423

WHEEL ATTACHMENT FOR SLEDS

Louis Brunetti, Jackson Heights, N. Y.

Application April 27, 1935, Serial No. 18,683

5 Claims. (Cl. 280—8)

This invention relates to sleds and more particularly to an attachment for a conventional metal runner sled of the flexible type, whereby the sled may be used as a wheeled conveyance when snow or ice is not available.

An object of this invention is to provide in combination with a flexible runner sled, means adjustable along the length of the runners whereby the sled may be used in the conventional manner for movement over a slippery surface or may be used over a rough surface that is not slippery, the wheeled means by which the sled is transformed into a wheeled conveyance being easily adjustable so that a child can readily transform the sled into a wheeled conveyance at will.

Another object of this invention is to provide an attachment of this character which may be mounted on a flexible runner sled in a manner whereby the rear portions of the runner may act as brakes when the sled is rocked downwardly at the rear end thereof.

A further object of this invention is to provide an exceedingly simple attachment for a sled by means of which the sled may be transformed into a wheeled conveyance, the attachment being relatively simple in construction so as to not unduly add to the cost of the sled and so that when the attachment is applied to the sled it will not add undue weight and will not be cumbersome when in either operative or inoperative position upon the sled.

The above and various other objects and advantages of this invention will in part be described in, and in part be understood from the following detail description of the present preferred embodiment, the same being illustrated in the accompanying drawing wherein:—

In the drawing:—

Figure 1 is a detailed side elevation of a sled having wheels constructed according to an embodiment of this invention, mounted thereon.

Figure 2 is an enlarged sectional view taken on the line 2—2 of Figure 1.

Figure 3 is a side elevation of the device from the inside of the runner.

Figure 4 is a detail side elevation of one of the clamping members.

Referring to the drawing, wherein like characters of reference designate corresponding parts throughout the several views, the letter S designates a sled structure having a pair of flexible runners R disposed beneath a top T. This sled S has inverted T-shaped runners R, which are secured to the top T by means of bracing members B.

In order to provide a means whereby the sled S may be turned into a wheeled conveyance, I have provided an attachment in the form of pairs of wheels or rollers 10 which are mounted on a shaft or axle 11.

Preferably, anti-friction bearings 13 are disposed at the hub of the wheel 10 and positioned about the shaft 11 so that the wheel 10 may freely rotate upon the axle or shaft 11. This shaft 11 has a head 12 at one end and is provided with threads 14 at the opposite end upon which a wing nut 15 is threadably mounted. A pair of U-shaped clamping members 16 are disposed upon the shaft 11 between the nut 15 and the inner side of the wheel 10 and these clamping members 16 are adapted to engage about the lower portion of the runner R with one leg 17 engaging on the upper side of the runner R and the other or lower leg 18 engaging on the underside of the runner R. Preferably, the lower leg 18 of the U-shaped clamping member 16 is longer than the upper leg 17 so that the two confronting clamping members 16 will have their lower legs 18 contact one with another and the upper legs 17 of the clamping members 16 will contact with the stem portion of the T-shaped runner R.

In practice there are four of these wheels 10 and when the wheels 10 are in operative position, one pair will be disposed at a point spaced forwardly of the rear ends of the runners R and the other or front pair will be disposed adjacent the front portion of the runner R at the point where the runner R begins to curve upwardly. Each runner R is provided with a pair of stop members or pins 19 against which an end of a clamping member 16 is adapted to abut so as to prevent rearward movement of the wheel 10 when the clamping members 16 are in clamping position and the wheels 10 are in operative position.

It will be understood that the clamping members 16 are moved apart when being moved to operative position so that the rear clamping members 16 will readily move past the front stops 19.

In the use and operation of this attachment, when the sled S is used on a slippery surface, the wheels 10 will be disposed at the upper and forward ends of the runners R, as shown in the drawing. However, when it is desired to use the sled S as a wheeled conveyance, the two pairs of wheels 10 are moved downwardly and rearwardly by loosening the wing nut 15 so that the clamping members 16 will readily slide along the runners R. Preferably, the clamping members 16 are provided with elongated openings 20 through which the shaft 11 projects and a lock washer 21 is interposed between the wing nut 15 and the confronting clamping member 16. One pair of the wheels 10 is disposed adjacent the rear of the runners R, preferably in a position adjacent the forward end portion of the rear brace B. The other or front pair of the wheels 10 is disposed slightly forwardly of the front brace B. The wing nuts 15 are tightened so that the clamping members 16 will tightly engage about the runners R and each clamping member 16 will have its rear end abutting against a stop member 19. In this position, the sled S may be moved over a surface which is not slippery and the wheels 10 will permit ready movement of the sled S. When it is desired to stop the sled S and the wheels 10 are in operative position, the operator of the sled may rock rearwardly so as to bring rear ends of the runners R into contact with the surface over which the sled is moving, thereby causing the ends of the runners to drag on the surface. In this position, which is shown in dotted lines in the drawing, the front wheels 10 will be raised off of the plane surface.

It will be apparent that the detachable wheels 10 can be applied to any conventional flexible runner sled or any sled having a T-shaped runner without adding unduly to the weight of the sled and without undue cost.

While I have shown the wheels as being applied to the runners of sleds, it will be understood that I do not wish to be limited to this particular construction as, if desired, the wheels may be applied to the runners of certain types of vacuum cleaners and the like.

It is, of course, understood that various changes and modifications may be made in the details of construction and design of the above specifically described embodiment of this invention without departing from the spirit thereof, such changes and modifications being restricted only by the scope of the following claims.

I claim:—

1. As a new article of manufacture, a means for converting a sled into a wheeled conveyance comprising pairs of wheels, a shaft for each wheel, a pair of runner clamping members mounted on each shaft and threaded means engaging the shaft and the clamping members to adjustably secure each clamping member to a runner of a sled.

2. An attachment for a sled to convert the sled into a wheeled conveyance comprising pairs of wheels, an axle for each wheel provided with threads adjacent one end thereof, a pair of confronting U-shaped clamping members disposed on each axle and a tightening nut mounted on the axle for tightening the clamping members about the runner of the sled.

3. A means for converting a pair of runners into a wheeled conveyance comprising pairs of wheels and means for mounting said wheels on the runners, each of said mounting means comprising a threaded axle on one end of which a wheel is rotatably mounted, a nut on the axle and a pair of U-shaped clamping members loosely mounted on the axle between the nut and wheel and each clamping member having an opening through the bight thereof to loosely receive the axle, tightening of the nut on the axle effecting a tightening of the clamping members relative to the runners while simultaneously tightening the shaft relative to the clamping members.

4. A means for converting a pair of runners into a wheeled conveyance comprising pairs of wheels and means for mounting said wheels on the runners, each of said mounting means comprising a threaded axle on one end of which a wheel is rotatably mounted, a nut on the axle and a pair of U-shaped clamping members loosely mounted on the axle between the nut and wheel and each clamping member having an opening through the bight thereof to loosely receive the axle, tightening of the nut on the axle effecting a tightening of the clamping members relative to the runners while simultaneously tightening the shaft relative to the clamping members, one leg of each clamping member being longer than the other leg with the long legs of the clamping members in opposed relation to each other.

5. A means for converting a pair of runners into a wheeled conveyance comprising pairs of wheels and means for mounting said wheels on the runners, each of said mounting means comprising a threaded axle on one end of which a wheel is rotatably mounted, a nut on the axle and a pair of U-shaped clamping members loosely mounted on the axle between the nut and wheel and each clamping member having an opening through the bight thereof to loosely receive the axle, tightening of the nut on the axle effecting a tightening of the clamping members relative to the runners while simultaneously tightening the shaft relative to the clamping members, one leg of each clamping member being longer than the other leg with the long legs of the clamping members in opposed relation to each other, the long leg of each clamping member engaging beneath the runner and the short leg engaging on the upper side of the runner and said long legs having their confronting ends disposed in abutting relation.

LOUIS BRUNETTI.